(12) United States Patent
Kaminaka et al.

(10) Patent No.: US 6,268,063 B1
(45) Date of Patent: Jul. 31, 2001

(54) PROPYLENE RESIN COMPOSITION, PROCESS FOR THE PREPARATION THEREOF, AND USE THEREOF

(75) Inventors: Manabu Kaminaka; Motomu Takamura; Hitoshi Matsuoka, all of Tokuyama (JP)

(73) Assignee: Tokuyama Corporation, Yamaguchi-ken (JP)

( * ) Notice: Subject to any disclaimer, the term of this patent is extended or adjusted under 35 U.S.C. 154(b) by 0 days.

(21) Appl. No.: 09/382,805

(22) Filed: Aug. 25, 1999

(30) Foreign Application Priority Data

| Aug. 25, 1998 | (JP) | 10-239272 |
| Dec. 22, 1998 | (JP) | 10-364379 |
| Dec. 22, 1998 | (JP) | 10-365314 |
| Dec. 22, 1998 | (JP) | 10-365315 |
| Dec. 24, 1998 | (JP) | 10-366652 |

(51) Int. Cl.$^7$ ................................................. B32B 27/00
(52) U.S. Cl. ................................. 428/500; 428/515
(58) Field of Search ............................. 428/500, 515; 525/240

(56) References Cited

U.S. PATENT DOCUMENTS

| 4,576,994 | 3/1986 | Dorrer et al. | 525/247 |
| 5,300,365 | * 4/1994 | Ogale | 428/461 |
| 5,322,902 | 6/1994 | Schreck et al. | 525/247 |
| 5,623,021 | * 4/1997 | Pelliconi et al. | 525/240 |

FOREIGN PATENT DOCUMENTS

| 0477662A | 4/1992 | (EP) . |
| 0674991A | 10/1995 | (EP) . |

* cited by examiner

*Primary Examiner*—Paul Thibodeau
*Assistant Examiner*—Monique R Jackson

(57) ABSTRACT

A propylene resin composition featuring good flexibility and transparency without producing sticky feeling, and comprising a polypropylene component and a copolymer component of propylene and ethylene, wherein (I) the amount of the component (hereinafter referred to as medium- to low-temperature eluting component) that elutes out at temperatures of up to 90° C. by the temperature rising elution fractionation method by using an o-dichlorobenzene solvent is from 50 to 99% by weight of the whole amount, the amount of the component (hereinafter referred to as high-temperature eluting component) that elutes out at temperatures of not lower than 90° C. is from 50 to 1% by weight of the whole amount, and the amount of the component (hereinafter referred to as low-temperature eluting component) eluting out up to a temperature of 0° C. is not larger than 10% by weight of the whole amount, and (II) the content of the ethylene units in the component eluting up to the temperature of 90° C. is not smaller than 4% by weight but is smaller than 20% by weight, and the content of the propylene units in the component eluting at temperatures of not lower than 90° C. is from 97 to 100% by weight.

18 Claims, 4 Drawing Sheets

METHOD OF EVALUATING THE SURFACE STICKING PROPERTY

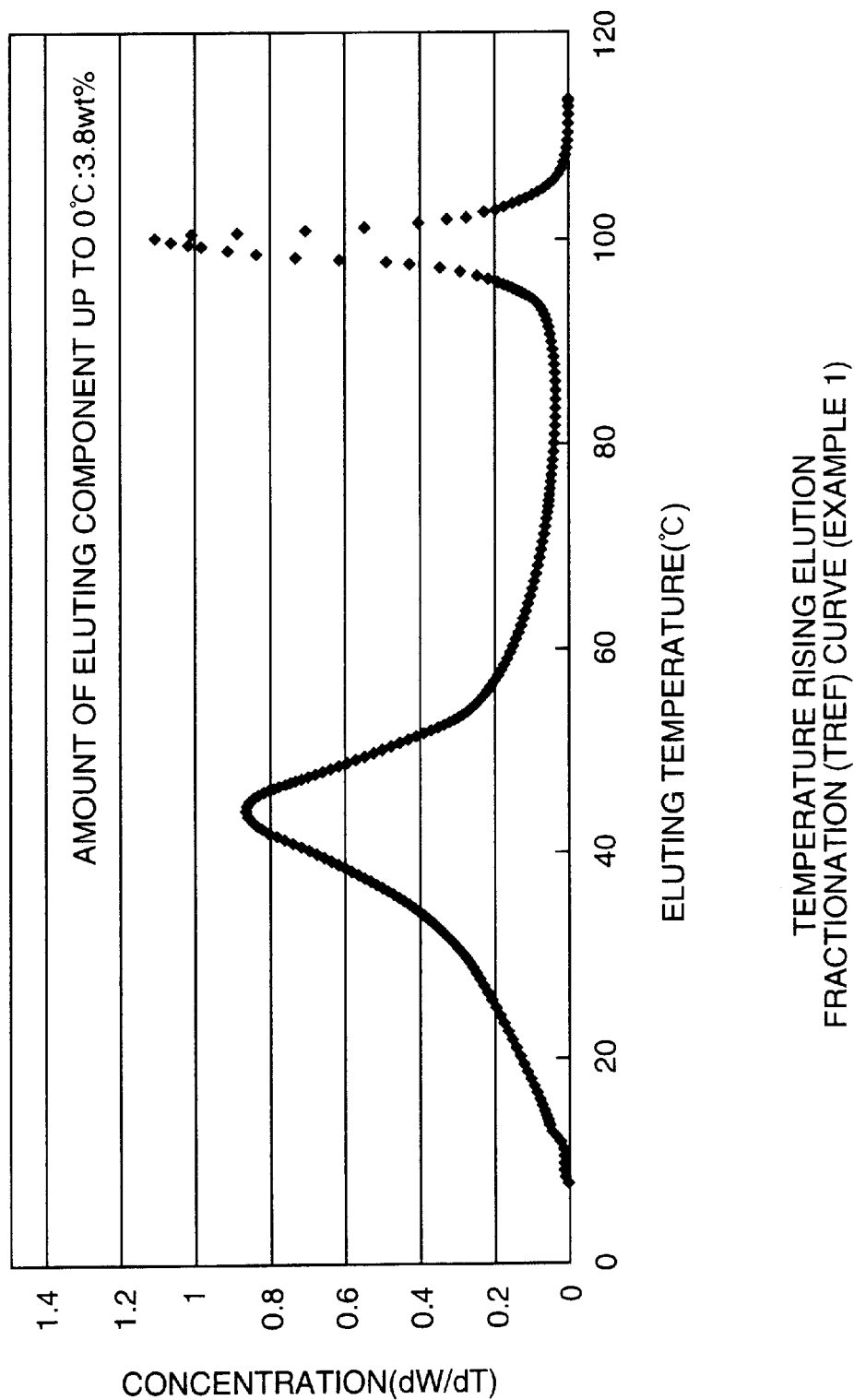

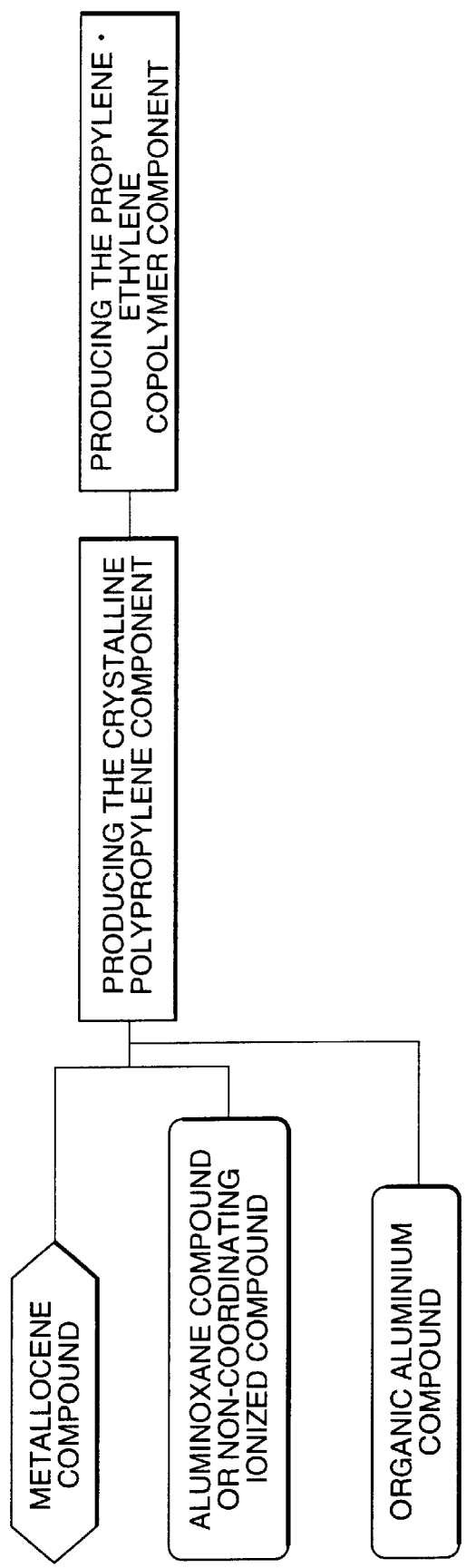

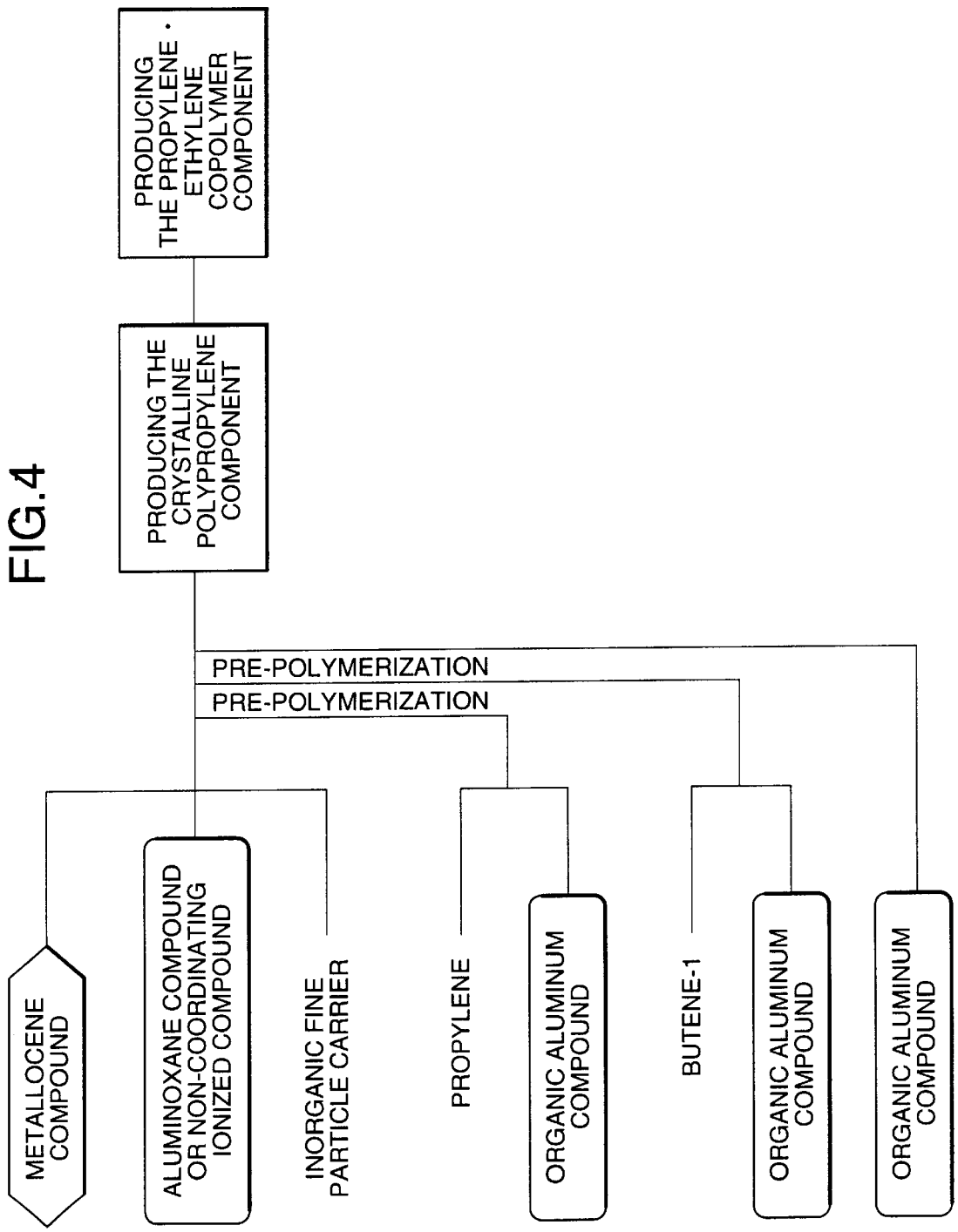

PROPYLENE RESIN COMPOSITION, PROCESS FOR THE PREPARATION THEREOF, AND USE THEREOF

BACKGROUND OF THE INVENTION

1. Field of the Invention

The present invention relates to a propylene resin composition featuring excellent flexibility and transparency without producing sticky feeling.

2. Prior Art

The olefinic thermoplastic elastomers feature excellent balance between economy and properties, and have been extensively utilized for automotive parts such as bumpers and the like, as well as in the fields of a variety of industrial parts, household electric appliances, films and sheets, since they are light in weight and can be recycled.

So far, the olefinic thermoplastic elastomers have been produced by a mechanical mixing method in which ethylene-propylene rubber (hereinafter referred to as EPR) or ethylene-propylene terpolymer (hereinafter referred to as EPDM) and thermoplastic resins such as polypropylene, are kneaded together through an extruder, and a method (polymerization method) in which the two components are prepared through a series of polymerization operations to obtain a mixture of the two components. The production based on the polymerization method is generally a two-stage polymerization method in which the propylene is polymerized through the first stage, and the ethylene and propylene are copolymerized through the second stage.

However, the conventional EPR and EPDM produce sticky feeling. Moreover, the molded articles comprising a mixture thereof with polypropylene produce sticky feeling, too, and exhibit white color or milky white color. Therefore, they cannot be used as materials for the containers, sheets, films and the like that require transparency.

The thermoplastic elastomers produced by the polymerization method offer good transparency compared to those obtained through the mechanical mixing. However, the resins obtained by the polymerization method produce sticky feeling, too, and the molded articles thereof exhibit white color or milky white color, and cannot be used in the fields where transparency is required.

It has therefore been urged to develop a material that features good properties such as flexibility possessed by the above-mentioned mixture of EPR or EPDM and polypropylene, and offers excellent transparency without producing sticky feeling.

In order to solve the above-mentioned problems, Japanese Patent No. 2677920 and Japanese Unexamined Patent Publication (Kokai) No. 118354/1995 teach that a propylene copolymer having a particular composition features good flexibility and transparency.

However, the propylene polymer obtained by the above-mentioned method still contains low crystallinity components as well as amorphous components which produce the sticky feeling and impairs the transparency, still leaving room for improvement concerning the sticky feeling and transparency.

SUMMARY OF THE INVENTION

The object of the present invention, therefore, is to provide a propylene resin composition having good flexibility and transparency without producing sticky feeling.

In order to accomplish the above-mentioned objects, the present inventors have conducted keen study, and have succeeded in developing a propylene resin composition blended with a predetermined amount of a copolymer of an ethylene and a propylene having low crystallinity containing amorphous components in limited amounts, and have accomplished the present invention after having discovered the fact that such a composition satisfies the above-mentioned object.

That is, the present invention is concerned with a propylene resin composition, comprising a polypropylene component and a copolymer component of propylene and ethylene, wherein (I) the amount of the component (hereinafter referred to as a medium- to low-temperature eluting component) that elutes out at temperatures of up to 90° C. by the temperature rising elution fractionation (TREF) method by using an o-dichlorobenzene solvent is from 50 to 99% by weight of the whole amount, the amount of the component (hereinafter referred to as a high-temperature eluting component) that elutes out at temperatures of not lower than 90° C. by the TREF method is from 50 to 1% by weight of the whole amount, and the amount of the component (hereinafter referred to as a low-temperature eluting component) eluting out at temperatures of up to 0° C. by the TREF method is not larger than 10% by weight of the whole amount, and (II) the content of the ethylene units in the medium- to low-temperature eluting component is not smaller than 4% by weight but is smaller than 20% by weight, and the content of the propylene units in the high-temperature eluting component is from 97 to 100% by weight.

BRIEF DESCRIPTION OF THE DRAWINGS

FIG. 2 shows a curve representing the elution of the propylene resin composition of Example 1 by the temperature rising elution fractionation method;

FIG. 3 is a flow chart illustrating a representative polymerization method of the present invention; and FIG. 4 is a flow chart illustrating a representative polymerization method of the present invention.

DETAILED DESCRIPTION OF THE PREFERRED EMBODIMENTS

Figure 1:
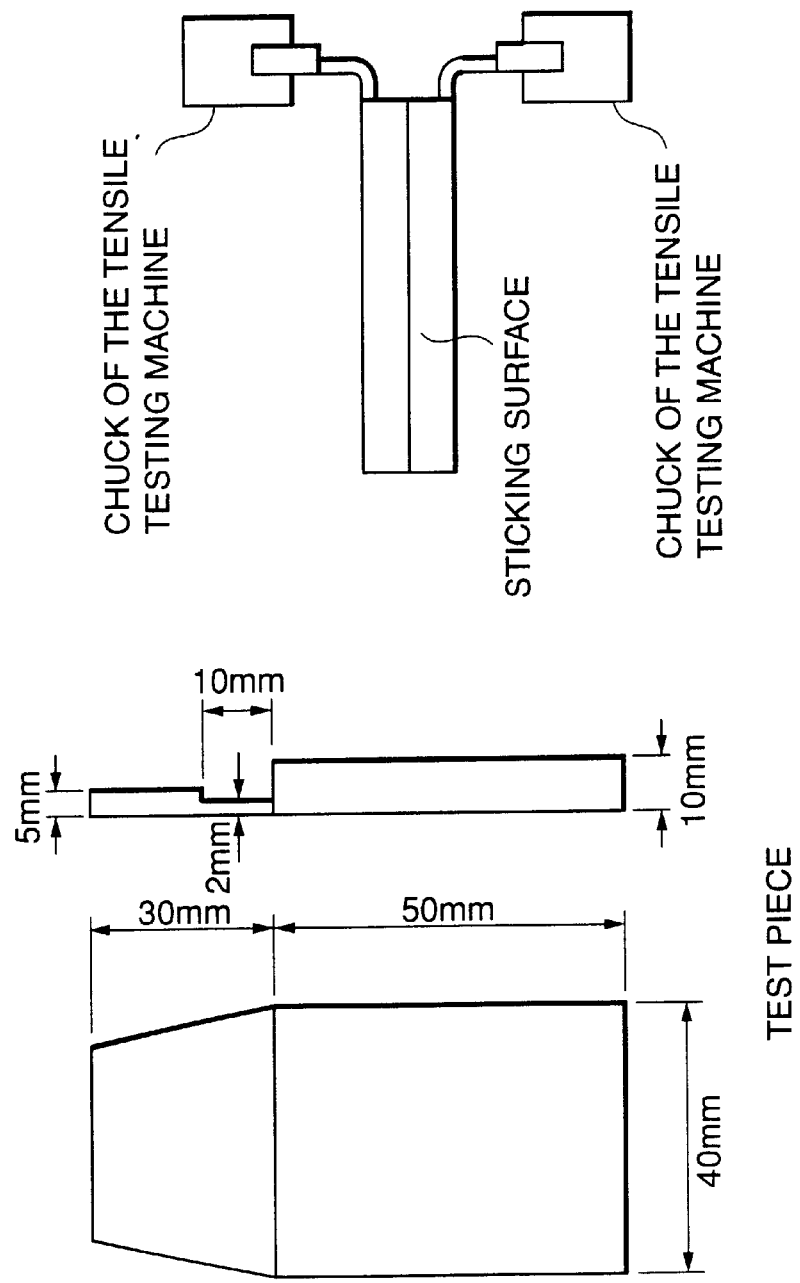
FIG. 1 is a diagram illustrating a method of evaluating the stickiness of a propylene resin composition of the present invention.

The invention will now be described in detail.

The propylene resin composition of the present invention is basically constituted by a polypropylene component and a copolymer component of propylene and ethylene.

The ratio of the polypropylene component to the copolymer component of propylene and ethylene can be specified by the amount of the eluting components found from a curve of elution based on the temperature rising elution fractionation (hereinafter referred to as TREF) by using o-dichlorobenzene as a solvent.

That is, the polypropylene component chiefly comprises components that elute out at temperatures of not lower than 90° C. in the elution curve based on the TREF method. The copolymer component of propylene and ethylene chiefly comprises components that elute out at temperatures of up to 90° C.

Here, the TREF method is the one that is described in detail in, for example, the Journal of Applied Polymer Science; Applied Polymer Symposium 45, 1–24, (1990). According to this method, a high molecular solution of a high temperature is introduced into a column filled with a filler of diatomaceous earth, and the column temperature is gradually lowered so that the components are crystallized on the surfaces of the filler in order of high crystallinity and, then, the column temperature is gradually raised so that the components are eluted out in order of low crystallinity, thereby to obtain the eluted polymer components separately. This method makes it possible to measure the distribution of crystallinities of macromolecules.

The feature of the present invention, i.e., excellent flexibility and transparency without producing sticky feeling, is very significantly affected by the ratio of the eluting components (distribution of crystallinities) as measured by the TREF method which indirectly represents the ratio of the polypropylene component to the copolymer component of propylene and ethylene.

In the propylene resin composition of the present invention, the high-temperature eluting component comprise from 97 to 100% by weight of the propylene unit. Concretely, the high-temperature eluting component includes a homopolymer of propylene or a random copolymer containing a monomer unit of α-olefin other than propylene or ethylene in an amount of not larger than 3% by weight, preferably, not larger than 1.5% by weight and, more preferably, not larger than 1% by weight. The product tends to lose heat resistance when the random copolymer contains the monomer unit other than propylene in an amount of larger than 3% by weight.

As the α-olefin, there can be used an α-olefin having 4 to 18 carbon atoms and, preferably, an α-olefin having 4 to 8 carbon atoms and, particularly preferably, 1-butene, 1-hexene or 1-octene.

In the propylene resin composition of the present invention, the portion of the high-temperature eluting components is from 1 to 50% by weight, preferably, from 3 to 30% by weight and, more preferably, from 5 to 20% by weight. When the ratio of the high-temperature eluting component is smaller than 1% by weight, as well as the heat resistance is lost, balance is lost among the rigidity and flexibility. When the ratio is larger than 50% by weight, transparency is deteriorated to a considerable degree.

In the propylene resin composition of the present invention, the medium- to low-temperature eluting component is necessary for imparting flexibility to the products, and is constituted by a lowly crystalline copolymer of ethylene and propylene including ethylene units in an amount of not smaller than 4% by weight but smaller than 20% by weight, preferably, from 5 to 17% by weight and, more preferably, from 6 to 15% by weight. It is desired that the above-mentioned copolymer is the one obtained by random-copolymerizing propylene and ethylene in order to effectively impart flexibility to the products.

When the content of ethylene units is smaller than 4% by weight in the medium- to low-temperature eluting component, the products exhibit less flexibility and transparency. When the content of ethylene unit is not smaller than 20% by weight, transparency decreases, sticky feeling increases, and the film products exhibit markedly decreased resistance against blocking.

In the propylene resin composition of the present invention, the amount of the medium- to low-temperature eluting component is from 50 to 99% by weight, preferably, from 70 to 97% by weight and, more preferably, from 80 to 95% by weight. When the amount of the medium- to low-temperature eluting component is smaller than 50% by weight, the product exhibits decreased flexibility and poor transparency. When the amount of the medium- to low-temperature eluting component is larger than 99% by weight, as well as the heat resistance is lost, balance is lost among the rigidity and flexibility.

Further, one of the features of the present invention is that the propylene resin composition contains the low-temperature eluting component in small amounts. It is important that the amount of the low-temperature eluting component is not larger than 10% by weight of the whole amount (whole amount of the medium- to low-temperature eluting component and high-temperature eluting component), preferably, not larger than 8% by weight and, more preferably, not larger than 6% by weight. When the amount of the eluting component exceeds 10% by weight, the products tend to lose transparency and heat resistance, and the film products tend to lose resistance against the blocking to a considerable degree, making it no longer possible to accomplish the object of the present invention.

There is no particular limitation on the constitution of the propylene resin composition of the present invention provided the above-mentioned constitution is satisfied. In order to improve transparency and heat resistance of the film which is a product, for example, it is desired that the melting point of the high-temperature eluting component is from 120 to 170° C. and, more preferably, from 130 to 155° C. as measured by using a differential scanning calorimeter (hereinafter referred to as DSC). The polypropylene having a melting point of higher than 170° C. is difficult to produce. When the polypropylene has a melting point of smaller than 120° C., on the other hand, the product exhibits decreased heat resistance.

It is desired that the molecular weight distribution dispersion degree (Mw/Mn) of the propylene resin composition of the present invention as measured by using a gel permeation chromatograph (GPC) is not larger than 5, preferably, not larger than 4 and, more preferably, not larger than 3.

When the molecular weight distribution dispersion degree becomes greater than the above-mentioned range, the amount of the low molecular components increases, whereby the tensile elongation of the product decreases, the product produces increased sticky feeling due to the bleeding of low molecular components, and the film product exhibits decreased resistance against the blocking.

It is further desired that the limiting viscosity [η] as measured in tetralin heated at 135° C. by using Ubbelohde's viscometer is from 0.5 to 5.0 dl/g, preferably, from 0.5 to 3.0 dl/g and, more preferably, from 0.8 to 2.0 dl/g. When the limiting viscosity [η] is smaller than 0.5 dl/g, the sticky feeling increases. When the limiting viscosity [η] is larger than 5.0 dl/g, the melt fluidity decreases and the moldability decreases.

It is desired that the propylene resin composition of the present invention has a melt flow rate of from 0.01 to 50 g/10 min., preferably from 0.1 to 30 g/10 min. and, more preferably, from 0.5 to 20 g/10 min. as measured at 230° C. under a load of 2.16 kg in compliance with ASTM-D1238. When the melt flow rate is larger than the above value, the melt tension of the product decreases and the moldability decreases. When the melt flow rate is smaller than the above value, the melt fluidity decreases and the moldability is deteriorated.

The quantity of heat at the endothermic peak as measured by using the DSC is not larger than 80 mJ/mg, preferably, not larger than 70 mJ/mg and, more preferably, not larger than 50 mJ/mg. Outside the above-mentioned range, the product tends to lose transparency.

In addition to the above-mentioned polypropylene component and the copolymer component of propylene and ethylene, the propylene resin composition of the present invention may further contain, as resin components, other α-olefin polymers in an amount that does not impair the effect of the propylene resin composition of the present invention, for example, in an amount of not larger than 5% by weight. Examples of the α-olefin may include 1-butene, 1-pentene, 3-methyl-1-butene, 1-hexene, 4-methyl-1-pentene, 4,4-dimethyl-1-pentene, 1-heptene, 4methyl-1-hexene, 4,4-dimethyl-1-hexene, 3-ethyl-1-hexene, 4-ethyl-1-hexene, 1-octene, 1-decene, 1-dodecene, 1-tetradecene, 1-hexadecene, 1-octadecene and 1-eicosene.

The propylene resin composition used in the present invention may be obtained by any method.

For example, the polypropylene component and the copolymer component of propylene and ethylene may be separately polymerized and then may be mixed together. It is, however, desired to obtain the propylene resin composition in the form of a so-called block copolymer in which the polypropylene component and the copolymer component of propylene and ethylene are arranged in a polymer chain and/or in which the polymer chains of the polypropylene component and the copolymer component of propylene and ethylene are mixed together in such a microscopic scale that cannot be achieved by the mechanical mixing, in order to obtain a film having more favorable transparency.

There is no particular limitation on the method of obtaining the propylene resin composition of the present invention as the block copolymer as far as the requirement of the present invention is satisfied. For example, the block copolymer of the propylene component and the random copolymer component of propylene and ethylene, can be favorably produced by the following method.

That is, there can be exemplified a method of stepwisely producing the polypropylene component (A) and the copolymer component (B) of propylene and ethylene in the presence of a metallocene compound (hereinafter abbreviated as component [I]) and aluminoxane compound and/or a non-coordinating ionized compound (hereinafter abbreviated as component [II]).

The above component [I] will be any known compound that is used for the polymerization of olefins. Among them, a chiral compound represented by the following general formula (1),

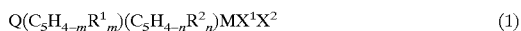

$$Q(C_5H_{4-m}R^1{}_m)(C_5H_{4-n}R^2{}_n)MX^1X^2 \qquad (1)$$

wherein M is a transition metal atom of the Group IVb of periodic table, $(C_5H_{4-m}R^1{}_m)$ and $(C_5H_{4-n}R^2{}_n)$ are substituted cyclopentadienyl groups, m and n are integers of 1 to 3, $R^1$ and $R^2$ may be the same or different and are hydrocarbon groups having 1 to 20 carbon atoms, hydrocarbon groups containing silicon, or hydrocarbon groups forming one or more hydrocarbon rings which may be substituted by hydrocarbon groups being bonded to two carbon atoms on a cyclopentadienyl ring, Q is a group capable of cross-linking $(C_5H_{4-m}R^1{}_m)$ and $(C_5H_{4-n}R^2{}_n)$, and is a divalent hydrocarbon group, unsubstituted silylene group or silylene group substituted with a hydrocarbon, and $X^1$ and $X^2$ may be the same or different and are hydrogen atoms, halogen atoms or hydrocarbon groups, can be preferably used.

More preferably, there can be used a chiral metallocene compound of the above-mentioned formula (1) in which M is a zirconium atom or a hafnium atom, $R^1$ and $R^2$ may be the same or different and are hydrocarbon groups having 1 to 20 carbon atoms, $X^1$ and $X^2$ may be the same or different and are halogen atoms or hydrocarbon groups, and Q is a silylene group substituted with a hydrocarbon.

Concrete examples of the component [I] include rac-dimethylsilylene(2,4-dimethylcyclopentadienyl)(3',5'-dimethylcyclopentadienyl)zirconium dichloride, rac-dimethylsilylene(2,4-dimethylcyclopentadienyl)(3',5'-dimethylcyclopentadienyl)zirconium dimethyl, rac-dimethylsilylene(2,3,5-trimethylcyclopentadienyl)(2',4',5'-trimethylcyclopentadienyl)zirconium dichloride, rac-dimethylsilylene(2,3,5-trimethylcyclopentadienyl)(2',4',5', 5'-trimethylcyclopentadienyl)zirconium dimethyl, rac-dimethylsilylenebis(2-methyl-indenyl)zirconium dichloride, rac-diphenylsilylenebis(2-methyl-indenyl)zirconium dichloride, rac-dimethylsilylenebis(2-methyl-indenyl) zirconium dimethyl, rac-diphenylsilylenebis(2-methyl-indenyl)zirconium dimethyl, rac-dimethylsilylenebis(2-methyl-4,5,6,7-tetrahydroindenyl)zirconium dichloride, rac-diphenylsilylenebis(2-methyl-4,5,6,7-tetrahydroindenyl) zirconium dichloride, rac-dimethylsilylenebis(2-methyl-4,5, 6,7-tetrahydroindenyl)zirconium dimethyl, rac-diphenylsilylenebis(2-methyl-4,5,6,7-tetrahydroindenyl) zirconium dimethyl, rac-dimethylsilylenebis(2,4-dimethyl-indenyl)zirconium dichloride, rac-diphenylsilylenebis(2,4-dimethyl-indenyl)zirconium dichloride, rac-dimethylsilylenebis(2,4-dimethyl-indenyl)zirconium dimethyl, rac-diphenylsilylenebis(2,4-dimethyl-indenyl) zirconium dimethyl, rac-dimethylsilylenebis(2-methyl-4-isopropylindenyl)zirconium dichloride, rac-diphenylsilylenebis(2-methyl-4-isopropylindenyl) zirconium dichloride, rac-dimethylsilylenebis(2-methyl-4-isopropylindenyl)zirconium dimethyl, rac-diphenylsilylenebis(2-methyl-4-isopropylindenyl) zirconium dimethyl, rac-dimethylsilylenebis(2-methyl-4,6-diisopropylindenyl)zirconium dichloride, rac-diphenylsilylenebis(2-methyl-4,6-diisopropylindenyl) zirconium dichloride, rac-dimethylsilylenebis(2-methyl-4,6-diisopropylindenyl)zirconium dimethyl, rac-diphenylsilylenebis(2-methyl-4,6-diisopropylindenyl) zirconium dimethyl, rac-dimethylsilylenebis(2-methyl-4-t-butylindenyl)zirconium dichloride, rac-diphenylsilylenebis (2-methyl-4-t-butylindenyl)zirconium dichloride, rac-dimethylsilylenebis(2-methyl-4-t-butylindenyl)zirconium dimethyl, rac-diphenylsilylenebis(2-methyl-4-t-butylindenyl)zirconium dimethyl, rac-dimethylsilylenebis (2-methyl-4-phenylindenyl)zirconium dichloride, rac-diphenylsilylenebis(2-methyl-4-phenylindenyl)zirconium dichloride, rac-dimethylsilylenebis(2-methyl-4-phenylindenyl)zirconium dimethyl, rac-diphenylsilylenebis (2-methyl-4-phenylindenyl)zirconium dimethyl, rac-dimethylsilylenebis(2-methyl-4-naphthylindenyl)zirconium dichloride, rac-diphenylsilylenebis(2-methyl-4-naphthylindenyl)zirconium dichloride, rac-dimethylsilylenebis(2-methyl-4-naphthylindenyl)zirconium dimethyl, rac-diphenylsilylenebis(2-methyl-4-naphthylindenyl)zirconium dimethyl, rac-dimethylsilylenebis(2-methyl-benzindenyl)zirconium dichloride, rac-diphenylsilylenebis(2-methyl-benzindenyl) zirconium dichloride, rac-dimethylsilylenebis(2-methyl-benzindenyl)zirconium dimethyl, and rac-diphenylsilylenebis(2-methyl-benzindenyl)zirconium dimethyl.

There can be also preferably used a compound in which zirconium is substituted by hafnium.

It is also allowable to use the metallocene compounds in combination.

As the component [II], there can be used any known compounds without limitation. Among them, the following compounds can be preferably used. As the aluminoxane compound, there can be used an aluminum compound represented by the general formula (2) or (3), $$R_2Al\text{———}(OAl)_{\overline{m}}\text{———}OAlR_2 \quad (2)$$
$$\qquad\qquad\quad |$$
$$\qquad\qquad\quad R$$

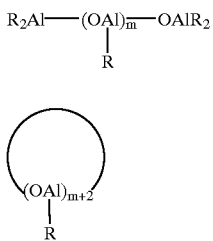 (3)

wherein R is an alkyl group having 1 to 6 carbon atoms and, preferably, 1 to 4 carbon atoms, such as methyl group, ethyl group, propyl group, butyl group or isobutyl group and, particularly preferably, the methyl group provided that the aluminum compound may include an alkyl group having 2 to 6 carbon atoms partly, and m is an integer of 4 to 100, preferably, 6 to 80 and, particularly preferably, 10 to 60.

The aluminoxane compound can be produced by various known methods, such as a method in which trialkylaluminum is directly reacted with water in a hydrocarbon solvent, or a method in which trialkylaluminum is reacted with water adsorbed in the hydrocarbon solvent by using a hydrate of copper sulfate having water of crystallization, hydrate of aluminum sulfate or hydrated silica gel.

The non-coordinating ionized compound will be a widely known one without any limitation. In particular, there can be used an ionized compound containing a boron atom.

Concrete examples of the ionized compound containing boron atom include Lewis acid containing a boron atom and an ionic compound containing a boron atom.

As the Lewis acid containing the boron atom, there can be exemplified a compound represented by the general formula (4), $$BR_3 \quad (4)$$

wherein R is a phenyl group that may have a substituent such as fluorine atom, a methyl group or a trifluoromethyl group, or is a fluorine atom.

Concrete examples of the compound represented by the above general formula include trifluoroborane, triphenylborane, tris(4-fluorophenyl)borane, tris(3,5-difluorophenyl) borane, tris(4-fluoromethylphenyl)borane, tris(pentafluorophenyl)borane, tris(p-tolyl)borane, tris(o-tolyl)borane, tris(3,5-dimethylphenyl)borane, etc. Among them, tris(pentafluorophenyl)borane is used preferably.

The ionic compound containing boron is a salt of a cationic compound and an anionic compound containing boron, such as trialkyl-substituted ammonium salt, N,N-dialkylanilinium salt, dialkylammonium salt or triarylphosphonium salt.

Examples of the trialkyl-substituted ammonium salt include triethylammonium tetra(phenyl)boron, tripropylammonium tetra(phenyl)boron, tri(n-butyl)ammonium tetra (phenyl)boron, trimethylammonium tetra(p-tolyl)boron, trimethylammonium tetra(o-tolyl)boron, tributylammonium tetra(pentafluorophenyl)boron, tripropylammonium tetra(o, p-dimethylphenyl)boron, tributylammonium tetra(m,m-dimethylphenyl)boron, tributylammonium tetra(p-trifluoromethylphenyl)boron, tri(n-butyl)ammonium tetra (o-tolyl)boron and the like.

Examples of the N,N-dialkylanilinium salt include N,N-dimethylanilinium tetra(phenyl)boron, N,N-diethylanilinium tetra(phenyl)boron, N,N-2,4,6-pentamethylanilinium tetra(phenyl)boron, and the like.

Examples of the dialkylammonium salt include di(1-propyl)ammonium tetra(pentafluorophenyl)boron, dicyclohexylammonium tetra(phenyl)boron and the like.

Examples of the triarylphosphonium salt include triphenylphosphonium tetra(phenyl)boron, tri(methylphenyl) phosphonium tetra(phenyl)boron, and tri(dimethylphenyl) phosphonium tetra(phenyl)boron.

There can be further exemplified triphenylcarbonium tetrakis(pentafluorophenyl)borate, N,N-dimethylanilinium tetrakis(pentafluorophenyl)borate, and ferrocenium tetra (pentafluorophenyl)borate.

Among them, triphenylcarbonium tetrakis (pentafluorophenyl)borate and N,N-dimethylanilinium tetrakis(pentafluorophenyl)borate are preferably used.

The components [I] and [II] can be used in any amounts. When the aluminoxane compound is used as the component [II], however, the component [II] is used in an amount (molar amount of Al atoms in the component [II]) of from 0.1 to 100,000 mols, preferably, from 1 to 50,000moles and, more preferably, from 10 to 30,000 moles per mol of the transition metal in the component [I]. When the non-coordinating ionized compound is used as the component [II], the component [II] is used in an amount (molar amount of boron atoms in the component [II]) of from 0.01 to 10,000 moles, preferably, from 0.1 to 5,000 moles and, more preferably, from 1 to 3,000 moles per mol of the transition metal in the component [I].

As required, it is possible to also use an organoaluminum compound (hereinafter abbreviated as component [III]) in the process for stepwisely preparing the polypropylene component and the copolymer component of propylene and ethylene in the presence of a catalyst comprising the components [I] and [II]. The component [III] is a compound represented by the general formula (5), $$AlR_mX_{3-m} \quad (5)$$

wherein R is a hydrocarbon group having 1 to 10 carbon atoms, such as alkyl group or aryl group, or an alkoxyl group, X is a halogen atom, and m is an atomic value of Al and is from 1 to 3.

Concrete examples of the compound represented by the above-mentioned general formula include trialkyl aluminum compounds such as trimethylaluminum, triethylaluminum, tri-n-propylaluminum, triisopropylaluminum, tri-n-butylaluminum, triisobutylaluminum, tri-n-hexylaluminum, tri-n-octylaluminum, and tri-n-decylaluminum; dialkylaluminum monohalides such as diethylaluminum monochloride, diethylaluminum monobromide, and diethylaluminum monofluoride; alkylaluminum halides such as methylaluminum sesquichloride, ethylaluminum sesquichloride and ethylaluminum dichloride; and alkoxyaluminum compounds such as diethylaluminum monoethoxide and ethylaluminum diethoxide. Among them, it is desired to use the trialkylaluminum such as trimethylaluminum, triethylaluminum or triisobutylaluminum.

Though there is no particular limitation, the component [III] is used in an amount of from 1 to 50,000 moles, preferably, from 5 to 10,000 moles and, more preferably, from 10 to 5,000 moles per a mole of the transition metal atoms in the component [I].

The component [I] and/or the component [II] can be used being carried on the fine particulate carrier (hereinafter abbreviated as component [IV]). When the catalyst components are carried on the carrier, the obtained polymer exhibits improved particulate property, making it possible to greatly improve process adaptability in the production of the resins, such as preventing the formation of polymer scales on the reactor.

The fine particulate carrier that works as a carrier can be used without any limitation. In particular, an inorganic oxide can be used.

Concretely speaking, there can be preferably used $SiO_2$, $Al_2O_3$, MgO, $ZrO_2$, $TiO_2$, $B_2O_3$, CaO, ZnO, BaO and $ThO_2$ or mixtures thereof, such as $SiO_2$—$Al_2O_3$, $SiO_2$—MgO, $SiO_2$—$TiO_2$, $SiO_2$—$V_2O_5$, $SiO_2$—$Cr_2O_3$, and $SiO_2$—$TiO_2$—MgO. Among them, it is particularly preferred to use a catalyst containing, as a chief component, at least one component selected from the group consisting of $SiO_2$ and $Al_2O_3$.

The inorganic fine particulate carrier is used usually being fired at a temperature of from 150 to 1000° C. and, preferably, from 200 to 800° C.

The carrier usually has a particle diameter of from 0.1 to 500 µm, preferably, from 1 to 200 µm and, more preferably, from 10 to 100 µm. When the particle diameter is small, the formed particles become a fine powdery polymer. When the particle diameter is too large, there result coarse particles which are difficult to handle.

The carrier has a porous volume which is usually from 0.1 to 5 cm³/g and, preferably, from 0.3 to 3 cm³/g. The porous volume can be measured by the BET method or the mercury intrusion porosity method.

The carrier has a specific surface area of from 50 to 1000 m³/g and, preferably, from 100 to 700 m³/g.

It is desired that the component [I] is used in an amount of from 0.005 to 1 mmol and, preferably, from 0.05 to 0.5 mmols reckoned as the amount of transition metal atoms per a gram of the component [IV]. When the aluminoxane compound is used as the component [II], the aluminoxane compound is used in an amount of from 1 to 200 mols and, preferably, from 15 to 150 mols reckoned as the molar amount of Al atoms per a mole of the transition metal atoms in the component [I].

When the non-coordinating ionized compound is used, the amount of use of the non-coordinating ionized compound is from 0.1 to 20 mols and, preferably, from 1 to 15 mols reckoned as the molar amount of boron atoms in the non-coordinating ionized compound per a mole of the transition metal atoms in the component [I].

The following method can be employed in order to obtain the polymer having excellent particulate properties.

That is, the olefin is pre-polymerized in the presence of the component [I], component [II], component [IV] and component [III]. There is no particular limitation on the amount of the component [III] used in the pre-polymerization. Usually, however, the component [III] is used in an amount of from 1 to 50,000 mols, preferably, from 5 to 10,000 moles and, more preferably, from 10 to 5,000 moles per a mole of the transition metal atoms in the component [I]. The components used in the pre-polymerization may be sequentially added one component by one component, or may be added at one time being mixed together. Preferably, there is employed a method by which the components [I] and [II] are brought into contact with the catalyst component [IV] in advance. More preferably, there is employed a method by which the catalyst component [IV] carries the component [II] and, then, carries the component [I], from the standpoint of obtaining a block copolymer having excellent bulk density.

Examples of the olefin used in the pre-polymerization include α-olefins such as ethylene, propylene, 1-butene, 1-pentene, 3-methyl-1-butene, 1-hexene, 4-methyl-1-pentene, 4,4-dimethyl-1-pentene, 1-heptene, 4-methyl-1-hexene, 4,4-dimethyl-1-hexene, 3-ethyl-1-hexene, 4-ethyl-1-hexene, 1-octene, 1-decene, 1-dodecene, 1-tetradecene, 1-hexadecene, 1-octadecene and 1-eicocene; and cyclic olefins such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene.

There can be further used styrene, dimethylstyrenes, allylnorbornane, allylbenzene, allylnaphthalene, allyltoluenes, vinylcyclopentane, vinylcyclohexane, vinylcycloheptane and diene. Preferred examples include ethylene, propylene, 1-butene, 1-pentene, 3-methyl-1-butene, 1-hexene, 4-methyl-1-pentene, 4,4-dimethyl-1-pentene, 1-heptene, 4-methyl-1-hexene, 4,4-dimethyl-1-hexene, 3-ethyl-1-hexene, 4-ethyl-1-hexene, 1-octene, 1-decene, cyclopentene and vinylcyclohexane. Particularly preferred examples include ethylene, propylene, 1-butene, 1-heptene, 3-methyl-1-butene, 1-hexene and 4-methyl-1-pentene.

It is desired that the pre-polymerization is substantially a homopolymerization of not less than 95 mol % of olefins.

The amount of polymerization of olefin conducted first in the pre-polymerization of the present invention may be selected to lie over a range of from 0.1 to 1000 g and, preferably, from 1 to 50 g per a gram of the catalyst comprising the catalyst components [I], [II] and [IV].

As a particularly preferred embodiment of pre-polymerization according to the present invention, the pre-polymerization is conducted stepwise; i.e., a first pre-polymerization catalyst is obtained by pre-polymerizing the propylene as the first pre-polymerization in the presence of the components [I], [II], [IV] and, if necessary, [III] and, then, pre-polymerizing the 1-butene as the second pre-polymerization in the presence of the above-mentioned first pre-polymerization catalyst and the component [III].

In the pre-polymerization of these steps, no particular limitation is imposed on the amount of the component [III]. Generally, however, the component [III] is used in an amount of from 1 to 50,000 moles, preferably, from 5 to 10,000 moles and, more preferably, from 10 to 5,000 moles per a mole of the transition metal atoms in the component [I]. It is desired that after the first pre-polymerization catalyst is obtained by the pre-polymerization of the propylene, the unreacted propylene and the component [III] that is used if necessary, are removed by washing, and the first pre-polymerization catalyst is used for the subsequent second pre-polymerization.

In each step of pre-polymerization, it is desired that the propylene and 1-butene are substantially subjected to the homopolymerization in an amount of not less than 95 mol % and, preferably, not less than 98 mol %.

The amount of polymerization of propylene conducted first in the pre-polymerization may lie over a range of from 0.1 to 1000 g and, preferably, from 1 to 10 g per a gram of the catalyst comprising the catalyst components [I], [II] and [IV]. Then, the amount of polymerization of 1-butene conducted next may lie over a range of from 0.1 to 1000 g and, preferably, from 1 to 500 g per a gram of the catalyst comprising the catalyst components [I], [II] and [III]. It is desired that the weight ratio of the amount of polymerization of propylene to the amount of polymerization of 1-butene (amount of polymerization of propylene/amount of polymerization of 1-butene) is from 0.001 to 100 and, preferably, from 0.005 to 10.

It is usually desired that the pre-polymerization is conducted relying upon the slurry polymerization by using, as a solvent, saturated aliphatic hydrocarbons or aromatic hydrocarbons such as hexane, heptane, cyclohexane, benzene or toluene, in a single kind or being mixed together. The temperatures of the first and second pre-polymerizations is from −20 to 100° C. and, particularly, from 0 to 60° C. Different temperatures may be employed depending on the steps of the pre-polymerizations. The time for the pre-polymerization may be suitably determined depending on the temperature of the pre-polymerization and the amount of polymerization in the pre-polymerization. Though there is no particular limitation, the pressure in the pre-polymerization is usually from atmospheric pressure to about 5 kg/cm$^2$ in the case of the slurry polymerization.

The pre-polymerization may be conducted by any of batchwise method, semi-batchwise method or continuous method.

After the pre-polymerization has been finished, it is desired that the polymer is washed with saturated aliphatic hydrocarbons or aromatic hydrocarbons such as hexane, heptane, cyclohexane, benzene or toluene, or with a mixture solvent thereof. It is usually desired that the number of times of washing is from 5 to 6 times.

In the method of obtaining the propylene resin composition of the present invention as a propylene/propylene-ethylene block copolymer relying on the polymerization, the polymerization of the polypropylene component and of the copolymer component of propylene and ethylene is stepwisely conducted in the presence of the above-mentioned catalyst components. There is no particular limitation on the order of polymerization. It is, however, desired to prepare the polypropylene component in the first step and prepare the copolymer component of propylene and ethylene in the second step, from the standpoint of producing the polymer maintaining favorable particulate property.

As for the polymerization conditions, there is no particular limitation so far as the effect of the present invention can be accomplished. Generally, however, the following conditions are preferred.

The polypropylene component may be polymerized by supplying the propylene alone or by supplying a mixture of the propylene with other α-olefin and/or ethylene within a range satisfying the requirement of the present invention. The temperature of the polymerization of the polypropylene component is from 0 to 100° C. and, preferably, from 20 to 80° C.

In the above-mentioned polymerization, hydrogen may be made present as a molecular weight-adjusting agent. Moreover, any method may be employed such as slurry polymerization, gas phase polymerization, or solution polymerization using the monomer used for the polymerization as a solvent. It is desired to employ the slurry polymerization using the propylene as a solvent from the standpoint of simple process, rate of reaction and particulate property of the copolymer that is formed.

The polymerization may be conducted based on any one of the batchwise system, semi-batchwise system or continuous system. The polymerization may further be conducted in two or more steps under different conditions of hydrogen concentration, polymerization temperature, etc.

Following the polymerization for obtaining the polypropylene component, a random copolymerization of propylene and ethylene is conducted. In the case of the slurry polymerization using propylene as a solvent, the random copolymerization of propylene and ethylene is conducted following the polymerization of propylene by feeding the ethylene gas. In the case of the gas phase polymerization, the random copolymerization of propylene and ethylene is conducted by feeding a mixture gas of propylene and ethylene.

In the random copolymerization of propylene and ethylene of the present invention, it is desired that a one-step random copolymerization is conducted following the polymerization of propylene. It is, however, also allowable to feed ethylene at a concentration varied in many steps. The temperature of the random copolymerization of propylene and ethylene is from 0 to 100° C. and, preferably, from 20 to 80° C. If necessary, furthermore, hydrogen may be used as a molecular weight-adjusting agent. In this case, the polymerization can be conducted while changing the hydrogen concentration in a multiplicity of steps or continuously.

The random copolymerization of propylene and ethylene may be conducted based on any one of batchwise system, semi-batchwise system or continuous system. Besides, the polymerization may be conducted being divided into a plurality of steps. The polymerization in this step may be any one of slurry polymerization, gas phase polymerization or solution polymerization.

After the end of the polymerization, the monomer is vaporized from the polymerization system to obtain the propylene resin composition of the present invention. The propylene resin composition can be washed in a known manner or counter-current washed with hydrocarbons having not more than 7 carbon atoms.

A commercially available additive such as anti-oxidizing agent, heat stabilizer, chlorine-trapping agent and the like agents may be added to the propylene resin composition of the present invention. After the additives are added, the resin composition may be pelletized by using an extruder. In addition to the above-mentioned additives, an organic peroxide may be added thereto and may be thermally decomposed to adjust the molecular weight to lie within a range in which the requirements of the present invention are satisfied.

The propylene resin composition of the present invention exhibits excellent transparency and flexibility that could not be obtained so far, and produces markedly decreased sticky feeling and, hence, exhibits excellent resistance against the blocking and excellent heat-sealing property and good transparency. Therefore, the propylene resin composition of the invention is suited for use as a film and, particularly, as a soft film. The film can be used without any limitation for packing foods, clothing, stationery and miscellaneous goods. Among these applications, the film can be particularly desirably used for packing foods, since the film does not lose transparency after the passage of time.

Any known method for forming the film can be used without limitation for forming the propylene resin composition into a film. Here, the temperature of formation is desirably from 200 to 300° C. and, more preferably, from 220 to 270° C. by taking into consideration the occurrence of melt fracture, moldability of film, and deterioration of the resin by heat. Any film-forming method can be employed, such as the one for forming an undrawn film using a T-die, the one for forming a monoaxially drawn film, the one for forming a biaxially drawn film, or the calender-molding method or the inflation-molding method.

In the present invention, the film does not have any strict meaning concerning the thickness and stands for sheets in general having thicknesses of, usually, from about 10 to about 1000 μm.

The soft film comprising the propylene resin composition obtained by the present invention features high transparency and good heat-sealing property. Upon laminating the soft film on the surface of other thermoplastic film such as polypropylene film, polyethylene film, polyethylene terephthalate film, polyamide film, polyvinyl chloride film or ethylene-vinyl acetate copolymer film, therefore, it is made possible to improve the heat-sealing property without impairing the properties of the thermoplastic resin film.

In particular, the soft film is compatible with the propylene homopolymer film and with the polypropylene resin film obtained by copolymerizing propylene and α-olefin other than propylene and/or ethylene, such as ethylene or 1-butene, in an amount of not larger than 5 mol %. Upon laminating the film of the present invention, therefore, there is obtained a film having excellent transparency and heat-sealing property.

Upon laminating the film of the invention on a soft resin film such as of low-density polyethylene, straight-chain low-density polyethylene, a copolymer of propylene and other α-olefin having a relatively low degree of crystallinity, or ethylene-vinyl acetate, furthermore, it is allowed to improve the heat-sealing property of the soft resin film.

There is no particular limitation on the constitution of the layers of the laminated films of when the soft film comprising the propylene resin composition of the present invention is employed as a surface layer, provided the soft film comprising the propylene resin composition of the invention is the surface layer. The structure is not limited to the two-layer structure of the soft film layer (A) of the propylene resin composition of the invention and the thermoplastic resin film layer (B), but may be the three-layer structure such as the layer (A), the layer (B) and the layer (A) by taking into consideration the properties such as rigidity of the film, flexibility, etc. It is further allowable to laminate other layer (C).

No particular limitation is imposed on the starting material of the other layer (C), and a variety of resins can be employed depending upon the object.

It is desired that the laminated film has a total thickness of from 10 to 100 μm and, particularly, from 20 to 60 μm.

As for the layers that are laminated one upon the other, it is desired that the layer (A) has a thickness of from 0.5 to 30 μm and, preferably, from 1 to 10 μm.

It is desired that the layer (B) has a thickness of from 5 to 70 μm and, particularly, from 10 to 50 μm.

Though there is no particular limitation, it is desired that the other layer (C) has a thickness of from 2 to 30 μm.

The starting materials of the layers forming the laminated film may, if necessary, be blended with additives such as antioxidant, lubricating agent, anti-blocking agent, antistatic agent and anti-fogging agent within ranges in which the effect of the present invention is not impaired.

The laminated film may simply be an undrawn film formed by extrusion or a drawn film that is monoaxially or biaxially drawn.

Though there is no particular limitation on the method of producing the laminated film, there can be employed a co-extrusion T-die method, co-extrusion inflation method, extrusion lamination method, dry lamination method or sandwiched lamination method. Among them, the co-extrusion T-die method is particularly preferably used.

When the co-extrusion T-die method is to be employed, the crystalline polyolefin may be used as the layer (B), the soft film comprising the propylene resin composition of the present invention may be used as the layer (A) and, if necessary, the crystalline polyolefin film may be used as the layer (C). In this case, a plurality of extruders are used to melt-extrude the films in a manner of layer (A)/layer (B)/layer (C), which are laminated before, after, or through the dies (co-extrusion lamination method).

There is no particular limitation on the conditions for forming the laminated film. In general, however, the resin temperature is maintained to be from 190 to 300° C., the air gap is maintained to be from 60 to 200 mm, the temperature of the cooling roll is maintained to be from 10 to 70° C., and the film-forming speed is set to be from 50 to 500 m/min.

The laminated film may be directly used but is desirably subjected to the corona-discharge treatment to improve adhesion to the printing ink.

There is no particular limitation on the conditions of the corona-discharge treatment. It is, however, desired that the wet tension on the surface of the film is maintained to be from 31 to 43 dynes/cm and, preferably, from 33 to 38 dynes/cm from the standpoint of adhesiveness of the laminated film to the printing ink and preventing the generation of offensive order caused by damage through the corona-discharge treatment.

There is no particular limitation on the use of the laminated film on which the propylene resin composition layer of the invention is laminated. The laminated film can be used for packing foods, clothing, stationery, miscellaneous goods, etc. Among them, the laminated film can be particularly favorably used for packing foods, since the laminated film does not lose transparency even after the passage of time.

The propylene resin composition of the present invention can be mixed into a known polypropylene resin as a heat-sealing property-improving agent in order to obtain a film having favorable heat-sealing property. The polypropylene resin that is used may be a propylene homopolymer, a random or block copolymer of propylene containing not less than 50 mols of a propylene unit and other α-olefin and/or ethylene, or a mixture thereof, or a polypropylene resin thereof blended with other thermoplastic resin. The polypropylene resin composition exhibits particularly excellent effect for improving copolymers having low melting points, such as propylene-ethylene copolymer, propylene-ethylene-butene-1 copolymer and propylene-α-olefin copolymer.

The mixing ratio is usually from 1 to 100 parts by weight and, preferably, from 2 to 60 parts by weight per 100 parts by weight of the polypropylene resin.

Though there is no particular limitation on the method of mixing the heat-sealing property-improving agent comprising the propylene resin composition of the present invention and a conventional polypropylene resin, there can be employed a powder-blending method or a pellet-blending method using a tumbler mixer or the Henschel's mixer. The thus obtained mixture of the polypropylene resin composition having improved heat-sealing property can, if necessary, be blended with a variety of additives such as antioxidant, hydrochloric acid-absorbing agent, anti-agglomerating agent, heat stabilizer, ultraviolet ray-absorbing agent, lubricating agent, weather-proofing agent, antistatic agent, nucleating agent, pigment and filler. Blending ratio can be suitably selected, and any widely known method can be used without limitation.

Any known film-forming method can be employed for molding the mixture of the propylene resin composition into a film which is a product. By taking into consideration the occurrence of melt fracture, moldability of the film and deterioration of the resin due to heat, it is desired that the molding temperature is usually from 200 to 300° C. and, preferably, from 220 to 270° C. The film can be molded as an undrawn film, a monoaxially drawn film or a biaxially drawn film through a T-die, or can be molded by the calendar-molding method or the inflation-molding method. The mixture of the polypropylene resin composition can be used as a single-layer film or as a heat-sealing layer for the multi-layer film. Further, the surface of the film may be subjected to the corona treatment.

Moreover, the propylene resin composition obtained by the present exhibits excellent flexibility, transparency, tensile elongation and heat resistance without sticky feeling, and can, hence, be preferably used in a variety of fields where the thermoplastic elastomer has heretofore been used. In the field of injection-molding, for example, the propylene resin composition can be used as bumpers, mudguards, packings for lamps, etc. which are the automotive parts. In the field of household electric appliances, the propylene resin composition can be used as various packings. The propylene resin composition can be further used for ski shoes, grips, roller skates, etc. In the field of extrusion-molding, the propylene resin composition can be used as internal materials in the compartment of automobiles, as various insulating sheets for household applications and electric wires and as covering materials for cords. In the field of civil engineering, furthermore, the propylene resin composition can be used as a water-proof sheet, water-blocking material, joint filler, and stretchable film for packing.

There is no particular limitation on the molding method, and any molding can be preferably used, such as extrusion-molding method, injection-molding method, press-molding method and vacuum-molding method to meet various applications.

In conducting the molding operation, furthermore, there can be blended a variety of stabilizers, antioxidant, ultraviolet ray-absorbing agent, antistatic agent, anti-agglomerating agent, lubricant, plasticizer, pigment, and inorganic or organic filler. Examples of the additives include 2,6-di-t-butyl-p-cresol, tetrakis[methylene-3-(3,5-di-t-butyl-4-hydroxyphenyl)propionate]methane, 4,4'-butylidenebis(6-t-butyl-m-cresol), tocophenols, ascorbic acid, dilaurylthiodipropionate, phosphoric acid stabilizer, fatty acid monoglyceride, N,N-(bis-2-hydroxyethyl)alkylamine, 2-(2'-hydroxy-3',5'-di-t-butylphenyl)-5-chlorobenzotriazole, calcium stearate, magnesium oxide, magnesium hydroxide, alumina, aluminum hydroxide, silica, hydrotalcite, talc, clay, gypsum, glass fiber, titania, calcium carbonate, carbon black, petroleum resin, polybutene, wax, and synthetic or natural rubber.

As will be understood from the foregoing description, the polypropylene resin composition having particular crystalline distribution as measured by the TREF method, exhibits excellent flexibility and transparency without producing sticky feeling and can, hence, be favorably used as a transparent and soft film and as a heat-sealing property-improving agent for the polypropylene resin without deteriorating transparency.

Moreover, the polypropylene resin composition can be favorably used in a variety of fields where the thermoplastic elastomer has heretofore been used.

EXAMPLES

The invention will now be concretely described by way of Examples and Comparative Examples to which only, however, the invention is in no way limited.

Properties of the polymers obtained in the following Examples and Comparative Examples were measured according to the methods described below.
(1) Melt flow rate (abbreviated as MFR):
  Measured in compliance with ASTM D1238.
(2) Bulk density:
  Measured in compliance with ASTM D1895.
(3) Melting point:
  By using DSC-6200R manufactured by Seiko Denshi Co., the sample in an amount of about 5 mg was introduced into an aluminum pan, heated up to 200° C. at a rate of 10° C./minute, maintained at 200° C. for 5 minutes, cooled down to room temperature at a rate of 20° C./minute and was heated again at a rate of 10° C./minute thereby to measure the melting point from an endothermic curve.
(4) Ethylene content:
  By using JEOL GSX-270, the $^{13}$C-NMR spectrum was measured.
(5) Molecular weight distribution:
  By using the 150C-type Gel Permeation Chromatography (GPC) manufactured by Waters Co., the sample was developed on a column GMH6HT (manufactured by Toso Co.). The molecular weight distribution (Mw/Mn) was found from the ratio of the obtained weight average molecular weight (Mw) to the number average molecular weight (Mn).
(6) TREF (temperature rising elution fractionation) curve:
  By using an automatic TREF apparatus (SSC-7300, ATREF) manufactured by Senshu Kagakusha Co., measurement was taken under the following conditions.
  Solvent: ortho-dichlorobenzene
  Flow rate: 150 ml/hour
  Rate of temperature rise: 4° C./hour
  Detector: Infrared-ray detector
  Measured wave number: 3.41 μm
  Column: Packed Column 30φ manufactured by Senshu Kagakusha Co., 30 mmφ×300 mm
  Concentration: 1 g/120 ml
  Pouring amount: 100 ml
  The sample solution was introduced at 145° C. into the column, gradually cooled down to −10° C. at a rate of 2° C. per hour so that the sample polymer was adsorbed on the surfaces of the filler. Then, the column temperature was raised under the above-mentioned conditions and, at the same time, the solvent was permitted to start flowing. The concentration of the polymer eluted at each of the temperatures was measured by the infrared-ray detector to obtain a curve of elution temperature vs. elution amount.
(7) Transparency (Haze value):
  Measured in compliance with JIS K6714.
(8) Flexural modulus of elasticity:
  Measured in compliance with ASTM D-790.
(9) Vicat softening temperature:
  Measured in compliance with JIS K7206 under the load of 250 g.
(10) Tensile stress:
  Measured in compliance with JIS K6251.
(11) Blocking property:
[In the Case of a 150 μm-thick Film and a Laminated Film (30 μm)]
  Two pieces of films (2×7 cm) were overlapped one upon the other over a length of 2 cm, left to stand for 24 hours under the application of the load of 500 g/cm$^2$ maintaining a temperature of 50° C., and its peeling strength was measured by using a tension tester (speed: 100 mm/min). In the case of the 150 μm-thick film, measurement was taken by overlapping the surfaces that contact to the casting roll upon each other and, in the case of the laminated film, by overlapping the surface layers of the propylene resin composition of the invention or of the comparative resin upon each other.
[In the Case of a 30 μm-thick Film (Excluding Laminated Film)]
  Two pieces of films (12×12 cm) were overlapped one upon the other, left to stand for 24 hours under the application of the load of 10 kg maintaining a temperature of 40° C., cut into a sample of 4×4 cm, and its peeling strength was measured by using the tension tester (speed: 100 mm/min). Measurement was taken by overlapping the surfaces that contact to the casting roll upon each other.

(12) −20° C. Impact strength:

By using the film impact tester manufactured by Toyo Seiki Co. and an impact head of a diameter of 1 cm at a temperature of −20° C., a value was calculated by dividing the energy value obtained under the condition of a capacity of 30 kg-cm by the thickness.

(13) Heat-sealing start temperature:

Two pieces of films were adhered together by using a heat sealer at a predetermined temperature under the load of 1 kg/cm$^2$ for 2 seconds to obtain a sample having a width of 15 mm, which was then measured for its peeling strength by using the tension tester (speed: 100 mm/min). The temperature at the time when the peeling force was 300 g/15 mm was regarded to be the heat-sealing start temperature. In the case of the single-layer film, measurement was taken by overlapping the surfaces that contact to the casting roll upon each other and, in the case of the laminated film, by overlapping the surface layers of the propylene resin composition of the invention or of the comparative resin upon each other.

(14) Sticky feeling:

A flat plate measuring 50 mm long, 40 mm wide and 1 mm thick was prepared by the injection-molding. Two pieces of the thus prepared flat plates were overlapped one upon the other and were left to stand for three days under the load of 3 kgf maintaining a temperature of 40° C. The thus overlapped two pieces of flat plates were pulled in a vertical direction with respect to the surfaces of adhesion at a test speed of 300 nm/min., and a maximum stress at peeling was evaluated (see FIG. 1).

Example 1

[Preparation of a Silica Gel-carried Metallocene Catalyst]

To 10 g of a silica gel-carried methylaluminoxane (MAO on SiO$_2$, 25 wt %-Al product produced by Wittco Co.) was added 100 ml of a toluene solution containing rac-dimethylsilylenebis-1-(2-methylindenyl)zirconium dichloride (0.005 mmols per a milliliter of toluene solution), and the mixture was stirred at room temperature for 30 minutes.

Next, the reaction mixture was filtered, and the obtained solid material was washed twice each with 50 ml of toluene and was dried under reduced pressure to obtain a metallocene catalyst carried by silica gel. Metallocene had been carried in an amount of 0.045 mmols per a gram of the catalyst.

[Polymerization]

(Pre-stage: Polymerization of Propylene)

To a polymerization vessel having a volume of 2 m$^3$ were introduced 600 kg of propylene and 612 mmols of triisobutylaluminum. Thereafter, the temperature in the polymerization vessel was raised to 55° C. Then, 5 g of the metallocene catalyst carried by the silica gel was introduced thereto, and the temperature in the autoclave was raised to 60° C. to conduct the polymerization for 70 minutes.

(Post-stage: Copolymerization of Propylene and Ethylene)

After the polymerization in the pre-stage, an ethylene gas was supplied up to a concentration of 16.1 mol % in terms of a gas phase concentration. The copolymerization was then conducted for 70 minutes while maintaining constant the gas phase concentration of ethylene. After the polymerization, the unreacted propylene was purged, and drying was conducted at 50° C. for one hour to obtain 150 kg of a white granular polymer.

The high-temperature elution component and the medium- to low-temperature elution component obtained from the polymer by the TREF were analyzed to find that the high-temperature elution component possessed a melting point of 146° C.

The medium- to low-temperature elution component contained ethylene in an amount of 8.6% by weight but exhibited no peak in the melting point as measured by DSC.

Table 1 shows MFR of the obtained polymer, molecular weight distribution, bulk density, amount of elution component by TREF, amount of high-temperature elution component, melting point, amount of medium- to low-temperature elution component and content of ethylene.

FIG. 2 shows a curve of elution of the polymer by the TREF method.

[Evaluation of Physical Properties]

To 100 parts by weight of the obtained polymer were added 0.1 part by weight of a 2,6-di-t-butyl-p-cresol as an antioxidant and 0.05 parts by weight of calcium stearate as a chlorine-trapping agent. The mixture was mixed together in the Henschel's mixer for 5 minutes, and was extruded by using an extrusion granulating machine having a screw diameter of 65 mm at 230° C. to prepare starting pellets which were then measured for their physical properties. The haze value was that of a test piece having a thickness of 3 mm for evaluating transparency obtained by the injection-molding. The results were as shown in Table 2.

Example 2

The procedure was carried out in the same manner as in Example 1 with the exception of conducting the polymerization in the pre-stage for 30 minutes, and setting the gas phase ethylene concentration to be 15.9 mol % in the polymerization in the post-stage and conducting the polymerization for 110 minutes. The results were as shown in Tables 1 and 2.

Example 3

The procedure was carried out in the same manner as in Example 1 with the exception of conducting the polymerization in the pre-stage for 90 minutes, and setting the gas phase ethylene concentration to be 15.9 mol % in the polymerization in the post-stage and conducting the polymerization for 50 minutes. The results were as shown in Tables 1 and 2.

Example 4

The procedure was carried out in the same manner as in Example 1 with the exception of conducting the polymerization in the pre-stage for 110 minutes, and setting the gas phase ethylene concentration to be 16.3 mol % in the polymerization in the post-stage and conducting the polymerization for 30 minutes. The results were as shown in Tables 1 and 2.

Example 5

The procedure was carried out in the same manner as in Example 1 with the exception of conducting the polymerization in the pre-stage for 80 minutes, and setting the gas phase ethylene concentration to be 30.3 mol % in the polymerization in the post-stage and conducting the polymerization for 60 minutes. The results were as shown in Tables 1 and 2.

Example 6

The procedure was carried out in the same manner as in Example 1 with the exception of conducting the polymerization in the pre-stage for 120 minutes, and setting the gas phase ethylene concentration to be 32.7 mol % in the polymerization in the post-stage and conducting the polymerization for 20 minutes. The results were as shown in Tables 1 and 2.

Example 7

[Preparation of the Catalyst-carrier Metallocene Catalyst]

Procedure was carried out in the same manner as in Example 1.

[Pre-polymerization]

Into a 1-litter autoclave substituted with $N_2$ were introduced 200 ml of refined heptane, 50 mols of triisobutylaluminum and carried metallocene catalyst component in an amount of 5 mmols reckoned as Zr atoms. Then, propylene was continuously introduced for 1 hour in such an amount that the amount of the propylene was 5 g with respect to 1 g of the carried metallocene catalyst component to conduct the pre-polymerization. The temperature during this period was maintained at 15° C.

After 1 hour has passed, introduction of propylene was terminated, and the interior of the reactor was substituted with $N_2$ to a sufficient degree. The solid component of the obtained slurry was washed with the refined heptane 6 times.

[Polymerization]

By using the above pre-polymerization catalyst, the procedure was conducted in the same manner as in the [polymerization] in Example 1. The results were as shown in Table 1.

[Evaluation of Physical Properties]

Physical properties were evaluated in the same manner as in Example 1. The results were as shown in Table 2.

Example 8

[Preparation of the Catalyst-carrier Metallocene Catalyst]

The procedure was carried out in the same manner as in Example 1.

[Pre-polymerization]

Into a 1-litter autoclave substituted with $N_2$ were introduced 200 ml of refined heptane, 50 mmols of triisobutylaluminum and carried metallocene catalyst component in an amount of 5 mmols reckoned as Zr atoms. Then, propylene was continuously introduced for 1 hour in such an amount that the amount of the propylene was 5 g with respect to 1 g of the carried metallocene catalyst component to conduct the pre-polymerization.

The temperature during this period was maintained at 15° C. After 1 hour has passed, introduction of the propylene was terminated, and the interior of the reactor was substituted with $N_2$ to a sufficient degree. The solid component (first pre-polymerization catalyst) of the obtained slurry was washed with the refined heptane 6 times.

The first pre-polymerization catalyst was introduced into a 1-liter autoclave substituted with $N_2$, and into which were added 200 ml of refined heptane and 50 mmols of triisobutylaluminum. Moreover, 1-butene was continuously introduced into the reactor for 1 hour so that the amount of 1-butene was 20 g with respect to 1 g of the carried metallocene catalyst component, to conduct the pre-polymerization. The temperature during this period was maintained at 15° C.

The solid component of the obtained slurry was washed with refined heptane 6 times to obtain a pre-polymerizaton catalyst comprising a metallocene-containing polyolefin.

[Polymerization]

By using the above pre-polymerization catalyst, the procedure was carried out in the same manner as in the [polymerization] in Example 1. The results were as shown in Table 1.

[Evaluation of Physical properties]

Physical properties were evaluated in the same manner as in Example 1. The results were as shown in Table 2.

Example 9

[Polymerization]

(Pre-stage: Polymerization of Propylene)

To an autoclave having a volume of 2 litters were introduced 450 g of propylene and 1 ml of a toluene solution of methylaluminoxane (PMAO-S, produced by Toso-Akuzo Co., 3.1 mmol-Al/ml). Thereafter, the temperature in the autoclave was raised to 55° C. Then, into the autoclave was introduced the whole amount of the mixture solution of 0.5 ml of the toluene solution of methylaluminoxane (PMAO-S, produced by Toso-Akuzo Co., 3.1 mmol-Al/ml) that has been pre-activated at room temperature for 15 minutes and 0.1 mg of rac-dimethylsilylenebis-1-(2-methylbenzindenyl) zirconium dichloride. Then, the temperature in the autoclave was raised to 60° C. to conduct the polymerization for 70 minutes.

(Post-stage: Copolymerization of Propylene and Ethylene)

After the polymerization in the pre-stage, an ethylene gas was supplied up to a concentration of 15.5 mol % in terms of a gas phase concentration. The copolymerization was then conducted for 70 minutes while maintaining constant the gas phase concentration of ethylene. After the polymerization, the unreacted propylene was purged and was dried at 50° C. for one hour to obtain 150 g of a white mass of polymer.

[Evaluation of Physical Properties]

The properties were evaluated in the same manner as in Example 1. The results were as shown in Table 2.

Example 10

[Polymerization]

The procedure was carried out in the same manner as in Example 9 with the exception of using 0.01 mg of a dimethylsilylenebis(2-methyl-4-naphthyl-indenyl) zirconium dichloride instead of metallocene used in Example 9. A polymer in the form of a white mass was obtained in an amount of 145 g. The results were as shown in Tables 1 and 2.

Example 11

[Preparation of a Random Copolymer]

To a polymerization vessel having a volume of 2 litters were introduced 450 g of propylene and 1.2 mmols of a triisobutylaluminum. Thereafter, the temperature in the polymerization vessel was raised to 55° C., and an ethylene gas was supplied up to a concentration of 15.9 mol % in terms of a gas phase concentration. Then, the metallocene catalyst carried by silica gel prepared in the same manner as in Example 1 was introduced in an amount of 5 mg. The temperature in the autoclave was then raised to 60° C., and the polymerization was conducted for 120 minutes while supplying ethylene so as to maintain its gas phase concentration constant. After the polymerization, the unreacted propylene was purged, and drying was conducted at 50° C. for 1 hour to obtain a polymer in the form of a white mass in an amount of 150 g. Since the polymer was in the form of a mass, the bulk density could not be measured.

[Blending with Crystalline Polypropylene]

The crystalline polypropylene (propylene homopolymer, MFR=2.0 g/10 min., Mw/Mn=6.2, melting point=163° C.) in an amount of 20 parts by weight and the random copolymer (obtained by freezing and pulverizing the polymer of the form of a mass) in an amount of 80 parts by weight, were blended together. Table 1 shows the results of the obtained blend.

[Evaluation of Physical Properties]

Evaluated in the same manner as in Example 1. The results were as shown in Table 2.

Comparative Example 1

[Preparation of a Catalyst]

The catalyst was prepared in compliance with a method of Example 1 disclosed in Japanese Unexamined Patent Publication (Kokai) No. 83006/1983. That is, 0.95 g (10 mmols) of anhydrous magnesium chloride, 10 ml of decane and 4.7 ml (30 mmols) of 2-ethylhexyl alcohol were heated and stirred at 25° C. for 2 hours.

Into this solution was added 0.55 g (6.75 mmols) of phthalic anhydride, and the mixture was further stirred at 125° C. for 1 hour to obtain a homogeneous solution. After cooled to room temperature, the whole amount of the solution was dropwisely added to 40 ml (0.36 mmols) of titanium tetrachloride maintained at 120° C. over a period of 1 hour.

Thereafter, the temperature of the mixture solution was raised to 110° C. over a period of 2 hours. When the temperature of 110° C. was reached, 0.54 ml of diisobutyl phthalate was added thereto, and the mixture was stirred at 110° C. for 2 hours. After the reaction for 2 hours, a solid portion was collected by filtering. The solid portion was suspended in 200 ml of $TiCl_4$ and was reacted again at 110° C. for 2 hours.

After the reaction, the reaction was conducted again at 110° C. for 2 hours. After the reaction, the solid portion was collected by thermal filtering, and was washed with decane and hexane to a sufficient degree until free titanium compound was no longer detected. The solid titanium catalyst possessed a composition of 2.1% by weight of titanium, 57% by weight of chlorine, 18.0% of magnesium, and 21.9% by weight of diisobutyl phthalate.

[Pre-polymerization]

To an autoclave having a volume of one liter substituted with nitrogen were introduced 200 ml of refined n-hexane, 50 mmols of triethylaluminum, 10 mmols of diphenyldimethoxysilane, 50 mmols of ethyl iodide, and solid titanium catalyst in an amount of 5 mmols reckoned as titanium atoms. Then, propylene was continuously introduced into the autoclave over a period of 30 minutes such that the amount of propylene was 3 g per 1 g of the solid catalyst component. The temperature during this period was maintained at 15° C.

After 30 minutes have passed, the reaction was discontinued, and the interior of the autoclave was substituted with nitrogen to a sufficient degree. The solid portion of the obtained slurry was washed with refined n-hexane four times to obtain a polypropylene containing titanium. As a result of analysis, 2.1 g of propylene had been polymerized per 1 g of the solid titanium catalyst component.

[Polymerization]

(Pre-stage: Polymerization of Propylene)

To a polymerization vessel having a volume of 2 m$^3$ were introduced 600 kg of propylene, 612 mmols of triethylaluminum, 306 mmols of cyclohexylmethyldimethoxysilane, and hydrogen gas. The temperature in the polymerization vessel was raised to 55° C.

Then, the titanium-containing polypropylene was introduced in an amount of 1.4 mmols reckoned as titanium atoms to start the polymerization. Then, the temperature in the autoclave was raised to 60° C. to conduct the polymerization for 40 minutes.

(Post-stage: Copolymerization of Propylene and Ethylene)

After the polymerization in the pre-stage, an ethylene gas was supplied up to a concentration of 5.5 mol % in terms of the gas phase concentration, and the copolymerization was conducted for 100 minutes while supplying ethylene so as to maintain its gas phase concentration constant.

After the polymerization, the unreacted propylene was purged, and drying was effected at 50° C. for 1 hour to obtain a white granular polymer in an amount of 145 kg. The results were as shown in Table 1.

[Evaluation of Physical Properties]

Evaluated in the same manner as in Example 1. The results were as shown in Table 2.

Comparative Example 2

The procedure was carried out in the same manner as in Example 1 with the exception of conducting the pre-stage polymerization for 50 minutes and the post-stage polymerization for 90 minutes in the [polymerization] of Example 1. The results were as shown in Tables 1 and 2.

Comparative Example 3

The procedure was carried out in the same manner as in Example 1 with the exception of conducting the pre-stage polymerization for 90 minutes, the post-stage polymerization for 50 minutes and setting the ethylene gas phase concentration to 47.8 mol % in the [polymerization] of Example 1. The results were as shown in Tables 1 and 2.

Comparative Example 4

The procedure was carried out in the same manner as in Example 1 with the exception of conducting the pre-stage polymerization for 10 minutes, the post-stage polymerization for 130 minutes and setting the ethylene gas phase concentration to 16.1 mol % in the [polymerization] of Example 1. The results were as shown in Tables 1 and 2.

Comparative Example 5

The procedure was carried out in the same manner as in Example 1 with the exception of conducting the pre-stage polymerization for 120 minutes, the post-stage polymerization for 20 minutes and setting the ethylene gas phase concentration to 15.9 mol % in the [polymerization] of Example 1. The results were as shown in Tables 1 and 2.

Comparative Example 6

The procedure was carried out in the same manner as in Example 1 with the exception of conducting the pre-stage polymerization for 60 minutes, setting the ethylene gas phase concentration to 6.0 mol %, conducting the post-stage polymerization for 80 minutes and setting the ethylene gas phase concentration to 16.0 mol % in the [polymerization] of Example 1. The results were as shown in Tables 1 and 2.

TABLE 1

| | TREF eluting component | | Amount of TREF eluting component (wt %) | | | | Molecular | |
|---|---|---|---|---|---|---|---|---|
| | 90° C. or higher | Up to 90° C. | | | | | weight | |
| | Melting point (° C.) | Ethylene content (wt %) | Ethylene content (wt %) | Up to 90° C. | | | | Bulk density (g/ml) |
| | | | | Up to 0° C. | From 0° C. up to 90° C. | 90° C. or higher | MFR (g/10 min) | distri- bution (Mw/Mn) | |
| Ex. 1 | 146 | <1 | 8.6 | 3.8 | 77.9 | 18.3 | 15.3 | 2.5 | 0.33 |
| Ex. 2 | 146 | <1 | 8.5 | 4.5 | 93.3 | 3.2 | 16.0 | 2.6 | 0.29 |
| Ex. 3 | 146 | <1 | 8.5 | 3.3 | 67.2 | 29.5 | 14.3 | 2.1 | 0.37 |
| Ex. 4 | 146 | <1 | 8.7 | 2.1 | 52.2 | 45.7 | 9.2 | 2.3 | 0.39 |
| Ex. 5 | 146 | <1 | 14.2 | 3.5 | 77.9 | 18.6 | 20.3 | 2.8 | 0.27 |
| Ex. 6 | 146 | <1 | 16.5 | 2.8 | 53.7 | 43.5 | 15.8 | 2.3 | 0.31 |
| Ex. 7 | 146 | <1 | 8.7 | 3.7 | 77.9 | 18.4 | 15.2 | 2.3 | 0.36 |
| Ex. 8 | 146 | <1 | 8.5 | 3.2 | 78.3 | 18.5 | 15.5 | 2.5 | 0.41 |
| Ex. 9 | 146 | <1 | 8.3 | 3.8 | 78.0 | 18.2 | 15.8 | 2.3 | not measurable |
| Ex. 10 | 159 | <1 | 8.4 | 3.3 | 78.6 | 18.1 | 25.1 | 2.1 | not measurable |
| Ex. 11 | 163 | <1 | 8.5 | 3.4 | 78.3 | 18.3 | 13.0 | 2.7 | — |
| Comp. Ex. 1 | 162 | <1 | 16.0 | 36.5 | 45.0 | 18.5 | 15.6 | 6.4 | 0.30 |
| Comp. Ex. 2 | 146 | <1 | 2.0 | 0.5 | 81.2 | 18.3 | 15.3 | 2.3 | 0.40 |
| Comp. Ex. 3 | 146 | <1 | 25.3 | 62.3 | 19.2 | 18.5 | 25.8 | 2.9 | 0.25 |
| Comp. Ex. 4 | 146 | <1 | 8.6 | 4.8 | 94.7 | 0.5 | 18.2 | 2.1 | not measurable |
| Comp. Ex. 5 | 146 | <1 | 8.5 | 1.8 | 40.2 | 58.0 | 7.3 | 2.1 | 0.40 |
| Comp. Ex. 6 | 125 | 3.2 | 8.6 | 4.0 | 79.8 | 16.2 | 14.5 | 2.3 | 0.18 |

TABLE 2

| | Flexural modulus of elasticity (MPa) | Transparency (Haze) (%) | Vicat softening temperature (° C.) | Sticky feeling (gf) |
|---|---|---|---|---|
| Example 1 | 340 | 30.5 | 134.1 | 0 |
| Example 2 | 200 | 28.3 | 100.0 | 0 |
| Example 3 | 574 | 33.5 | 142.1 | 0 |
| Example 4 | 727 | 36.3 | 145.1 | 0 |
| Example 5 | 118 | 28.0 | 81.8 | 0 |
| Example 6 | 172 | 38.7 | 98.1 | 0 |
| Example 7 | 335 | 30.6 | 132.4 | 0 |
| Example 8 | 347 | 29.8 | 131.9 | 0 |
| Example 9 | 352 | 29.7 | 133.4 | 0 |
| Example 10 | 398 | 35.1 | 145.8 | 0 |
| Example 11 | 420 | 39.3 | 145.9 | 0 |
| Comp. Example 1 | 212 | 65.8 | 110.0 | 160 |
| Comp. Example 2 | 823 | 55.8 | 144.9 | 0 |
| Comp. Example 3 | 72 | 60.9 | 55.8 | 50 |
| Comp. Example 4 | 98 | 30.9 | 63.9 | 10 |
| Comp. Example 5 | 921 | 55.2 | 145.8 | 0 |
| Comp. Example 6 | 125 | 30.4 | 69.8 | 5 |

Evaluation of Properties of Films

Example 12

[Pelletization]

To 5 kg of the polymer obtained in Example 1 were added 0.1 part by weight of a 2,6-di-t-butyl-p-cresol as an antioxidant, 0.05 parts by weight of calcium stearate as a chlorine-trapping agent, 0.15 parts by weight of a thyroid 55 (average particle diameter: 2.73 μm) as an antiblocking agent, and 0.06 parts by weight of erucic amide as a lubricating agent. The mixture was mixed together using the Henschel's mixer for 5 minutes, and was extruded and pelletized by a monoaxial extruder having a screw diameter of 65 mm at 230° C. to obtain starting pellets.

[Preparation of a Film]

The obtained pellets were supplied to an extruder having a diameter of 40 mm heated at 260° C., extruded through a mouth piece of a T-die, and was casted by a casting roll of which the surface temperature was adjusted to 40° C. to obtain an undrawn film having a thickness of 150 μm. Properties of the obtained film were as shown in Table 3.

Examples 13 to 22

By using the polymers obtained in Examples 2 to 11, undrawn films were obtained in the same manner as in Example 12. Properties of the obtained films were as shown in Table 3.

Comparative Examples 7 to 12

By using the polymers obtained in Comparative Examples 1 to 6, undrawn films were obtained in the same manner as in Example 12. Properties of the obtained films were as shown in Table 3.

Comparative Example 13

An undrawn film was obtained in the same manner as in Example 12 by using a resin obtained by mixing 100 parts by weight of a propylene/ethylene copolymer (MFR; 7.0 g/10 min., ethylene content; 3.5% by weight, melting point; 145° C.) and 100 parts by weight of an ethylene-butene-1 copolymer (MI; 7.0 g/10 min, 1-butene content; 12 mol %) as a soft resin. Properties of the obtained film were as shown in Table 3 (described as PP+EBR in Table 3).

Comparative Example 14

An undrawn film was obtained in the same manner as in Example 12 by using a propylene-butene-1 copolymer (MI; 7.0 g/10 min, butene-1 content; 23 mol %) as a lowly crystalline resin. Properties of the obtained film were as shown in Table 3 (described as PB copolymer in Table 3).

TABLE 3

|  | Resin | Film thickness (μm) | Tensile stress (kgf/mm$^2$) 23° C. MD | TD | 60° C. MD | TD | Blocking property (kgf/4 cm$^2$) | Haze | Impact strength (−20° C.) (kgf · cm) |
|---|---|---|---|---|---|---|---|---|---|
| Ex. 12 | Example 1 | 150 | 16 | 16 | 14 | 14 | 0.32 | 3.0 | 9.2 |
| Ex. 13 | Example 2 | 150 | 13 | 13 | 10 | 10 | 0.35 | 2.8 | 12.1 |
| Ex. 14 | Example 3 | 150 | 20 | 20 | 19 | 19 | 0.30 | 3.3 | 8.8 |
| Ex. 15 | Example 4 | 150 | 25 | 25 | 24 | 24 | 0.31 | 3.6 | 7.1 |
| Ex. 16 | Example 5 | 150 | 10 | 10 | 8 | 8 | 0.35 | 2.8 | 14.3 |
| Ex. 17 | Example 6 | 150 | 18 | 18 | 16 | 16 | 0.31 | 3.8 | 12.8 |
| Ex. 18 | Example 7 | 150 | 16 | 16 | 14 | 14 | 0.30 | 3.1 | 9.2 |
| Ex. 19 | Example 8 | 150 | 16 | 16 | 14 | 14 | 0.30 | 3.0 | 9.3 |
| Ex. 20 | Example 9 | 150 | 16 | 16 | 14 | 14 | 0.30 | 3.0 | 9.1 |
| Ex. 21 | Example 10 | 150 | 18 | 18 | 16 | 16 | 0.31 | 3.5 | 9.1 |
| Ex. 22 | Example 11 | 150 | 19 | 18 | 17 | 16 | 0.40 | 3.9 | 7.9 |
| Comp. Ex. 7 | Comp. Ex. 1 | 150 | 14 | 12 | 8 | 5 | 8.2 | 21.0 | 18.9 |
| Comp. Ex. 8 | Comp. Ex. 2 | 150 | 36 | 36 | 40 | 40 | 0.20 | 14.5 | 2.2 |
| Comp. Ex. 9 | Comp. Ex. 3 | 150 | 7 | 7 | 2 | 2 | 1.8 | 15.8 | 16.5 |
| Comp. Ex. 10 | Comp. Ex. 4 | 150 | 8 | 8 | 3 | 3 | 0.62 | 3.1 | 9.4 |
| Comp. Ex. 11 | Comp. Ex. 5 | 150 | 37 | 37 | 36 | 36 | 0.32 | 6.5 | 5.3 |
| Comp. Ex. 12 | Comp. Ex. 6 | 150 | 11 | 11 | 6 | 6 | 0.59 | 3.1 | 9.8 |
| Comp. Ex. 13 | PP + EBR | 150 | 18 | 16 | 3 | 3 | 3.8 | 22.0 | 18.4 |
| Comp. Ex. 14 | PB copolymer | 150 | 16 | 14 | 13 | 11 | 0.85 | 4.1 | 2.1 |

Example 23

Three extruders were used to extrude the polymer pellets obtained in Example 1 as the surface layer starting material (A), a crystalline propylene homopolymer (MI; 8.5 g/10 min) as the base layer starting material (B), and a crystalline propylene-ethylene-butene-1 copolymer (MI; 7 g/10 min, ethylene content; 3.7 mol %, 1-butene content; 3.5 mol %) as the other surface layer starting material (C) in a manner that the laminating ratio A:B:C was 1:2:1 thereby to obtain a laminated-layer film having a thickness of 30 μm. The results were as shown in Table 4. A change in the Haze value with the passage of time was evaluated by measuring the Haze value after the obtained film was preserved at 40° C. for one week.

Comparative Example 15

The procedure was carried out in the same manner as in Example 23 with the exception of using the polymer pellets obtained in Comparative Example 1 as the surface layer starting material (A). The results were as shown in Table 4.

Comparative Example 16

The procedure was carried out in the same manner as in Example 23 with the exception of using the resin obtained in Comparative Example 13 as the surface layer starting material (A). The results were as shown in Table 4.

Comparative Example 17

The procedure was carried out in the same manner as in Example 23 with the exception of using the resin obtained in Comparative Example 14 as the surface layer starting material (A). The results were as shown in Table 4.

TABLE 4

|  | Resin | Blocking property (Kgf/4 cm) | Heat-seal start temperature (° C.) | Haze (%) | Haze after the passage of time |
|---|---|---|---|---|---|
| Example 23 | Example 1 | 0.28 | 87 | 1.8 | 1.8 |
| Comp. Ex. 15 | Comp. Ex. 1 | 7.9 | 101 | 6.2 | 15.3 |
| Comp. Ex. 16 | Comp. Ex. 13 | 3.1 | 93 | 6.8 | 7.3 |
| Comp. Ex. 17 | Comp. Ex. 14 | 0.75 | 94 | 2.1 | 2.3 |

Evaluation of the Heat-Sealing Property-Improving Agent

Example 24

[Pelletization]

To 5 kg of the polymer obtained in Example 1 were added 0.1 part by weight of a 2,6-di-t-butyl-p-cresol as an antioxidant, 0.05 parts by weight of calcium stearate as a chlorine-trapping agent, 0.15 parts by weight of a thyroid (average particle diameter: 2.73 μm) as an antiblocking agent, and 0.06 parts by weight of erucic amide as a lubricating agent. The mixture was mixed together using the Henschel's mixer for 5 minutes, and was extruded and pelletized by a monoaxial extruder having a screw diameter of 65 mm at 230° C. to obtain starting pellets.

[Preparation of a Film]

Crystalline propylene-ethylene-1-butene copolymer pellets (MI; 7 g/10 min., ethylene content; 3.7 mol %, 1-butene content; 3.5 mol %) and the polymer pellets obtained in Example 1, were mixed together at a weight ratio of 80/20 (propylene-ethylene-1-butene copolymer/copolymer obtained in Example 1) by using a tumbler mixer. The mixture was melt-extruded by using a T-die film-forming machine having a screw diameter of 40 mm at a die temperature of 230° C., and was cooled by a casting roll having a surface temperature of 37° C. to obtain an undrawn film having a thickness of 30 μm. Properties of the obtained film were as shown in Table 5.

Examples 25 to 34

By using the polymers obtained in Examples 2 to 11, undrawn films were obtained in the same manner as in Example 24. Properties of the obtained films were as shown in Table 5.

Example 35

An undrawn film was obtained in the same manner as in Example 24 with the exception of using a propylene-ethylene-1-butene copolymer and a heat-sealing property-improving agent at a weight ratio of 70/30 (propylene-ethylene-1-butene copolymer/heat-sealing property-improving agent). Properties of the obtained film were as shown in Table 5.

Comparative Examples 18 to 23

Undrawn films were obtained in the same manner as in Example 24 with the exception of using the polymers obtained in Comparative Examples 1 to 6. Properties of the obtained films were as shown in Table 5.

Comparative Example 24

An undrawn film was obtained in the same manner as in Example 24 with the exception of using a lowly crystalline propylene-butene-1 copolymer (MI; 7.0 g/10 min, butene-1 content; 23 mol %) as the heat-sealing property-improving agent, and using the same propylene-ethylene-1-butene copolymer as that of Example 1 and the heat-sealing property-improving agent at a weight ratio of 80/20 (propylene-ethylene-1-butene copolymer/heat-sealing property-improving agent). Properties of the obtained film were as shown in Table 5.

Comparative Example 25

An undrawn film was obtained in the same manner as in Comparative Example 24 with the exception of using the propylene-ethylene-1-butene copolymer and the heat-sealing property-improving agent at a weight ratio of 70/30 (propylene-ethylene-1-butene copolymer/heat-sealing property-improving agent). Properties of the obtained film were as shown in Table 5.

Comparative Example 26

An undrawn film was obtained in the same manner as in Comparative Example 24 with the exception of using the ethylene-butene-1 copolymer (MI; 7.0 g/10 min, butene-1 content; 12 mol %) as a heat-sealing property-improving agent. Properties of the obtained film were as shown in Table 5.

Comparative Example 27

The procedure was carried out in the same manner as in Example 24 but without using the heat-sealing property-improving agent.

TABLE 5

|  | Resin | Improving agent/ crystalline propylene resin (weight ratio) | Heat-seal start temperature (° C.) | Blocking property (kgf/4 cm$^2$) | Haze |
| --- | --- | --- | --- | --- | --- |
| Ex. 24 | Example 1 | 20/80 | 107 | 0.22 | 1.8 |
| Ex. 25 | Example 2 | 20/80 | 105 | 0.23 | 1.5 |
| Ex. 26 | Example 3 | 20/80 | 109 | 0.20 | 1.9 |
| Ex. 27 | Example 4 | 20/80 | 110 | 0.21 | 2.0 |
| Ex. 28 | Example 5 | 20/80 | 104 | 0.25 | 1.8 |
| Ex. 29 | Example 6 | 20/80 | 105 | 0.20 | 1.9 |
| Ex. 30 | Example 7 | 20/80 | 107 | 0.20 | 1.8 |
| Ex. 31 | Example 8 | 20/80 | 106 | 0.20 | 1.8 |
| Ex. 32 | Example 9 | 20/80 | 107 | 0.20 | 1.8 |
| Ex. 33 | Example 10 | 20/80 | 110 | 0.21 | 2.3 |
| Ex. 34 | Example 11 | 20/80 | 111 | 0.30 | 2.5 |
| Ex. 35 | Example 1. | 30/70 | 99 | 0.35 | 1.9 |
| Comp. Ex. 18 | Comp. Ex. 1 | 20/80 | 119 | 6.2 | 6.5 |
| Comp. Ex. 19 | Comp. Ex. 2 | 20/80 | 124 | 0.18 | 3.8 |
| Comp. Ex. 20 | Comp. Ex. 3 | 20/80 | 119 | 1.5 | 3.9 |
| Comp. Ex. 21 | Comp. Ex. 4 | 20/80 | 115 | 0.52 | 2.8 |
| Comp. Ex. 22 | Comp. Ex. 5 | 20/80 | 115 | 0.22 | 3.4 |
| Comp. Ex. 23 | Comp. Ex. 6 | 20/80 | 114 | 0.39 | 2.5 |
| Comp. Ex. 24 | propylene/butene-1 copolymer | 20/80 | 115 | 0.64 | 2.1 |
| Comp. Ex. 25 | propylene/butene-1 copolymer | 30/70 | 109 | 0.75 | 2.3 |
| Comp. Ex. 26 | ethylene/butene-1 copolymer | 20/80 | 114 | 1.10 | 9.8 |
| Comp. Ex. 27 | — | 0/100 | 132 | 0.25 | 2.0 |

What is claimed is:

1. A propylene resin composition, comprising a polypropylene component and a copolymer component of propylene and ethylene, wherein (I) an amount of medium- to low-temperature eluting component which is defined as the component that elutes out at temperatures of up to 90° C. by the temperature rising elution fractionation method using an o-dichlorobenzene solvent is from 50 to 99% by weight of the whole eluted amount, an amount of a high-temperature eluting component which is defined as the component that elutes out at temperatures of not lower than 90° C. is from 50 to 1% by weight, and an amount of low-temperature eluting component which is defined as the component that elutes out up to a temperature of 0° C. is not larger than 10% by weight, and (II) the content of the ethylene units in the medium- to low-temperature eluting components is not smaller than 4% by weight but is smaller than 20% by weight, and the content of the propylene units in the high-temperature eluting components is from 97 to 100% by weight.

2. A propylene resin composition according to claim 1, wherein the high-temperature eluting component has a melting point of from 130 to 155° C. as measured by differential thermal scanning calorimeter.

3. A propylene resin composition according to claim 1 or 2, comprising a propylene/propylene-ethylene block copolymer.

4. A process for the preparation of a block copolymer according to claim 3, wherein the polypropylene component and the propylene/ethylene copolymer component are stepwisely prepared in the presence of a catalyst of a metallocene compound and an aluminoxane compound and/or a non-coordinating ionized compound.

5. A film comprising the propylene resin composition of claim 1.

6. A film obtained by laminating a layer of the propylene resin composition of claim 1 and a layer of a thermoplastic resin made from a resin other than the composition of claim 1.

7. A heat-sealing property-improving agent for a polypropylene film comprising a propylene resin composition of claim 1, wherein said polypropylene film is a film made from a resin other than the composition of claim 1.

8. A film comprising a mixture of 1 to 100 parts by weight of the polypropylene resin composition of claim 1 and 100 parts by weight of a propylene resin other than the resin of the composition of claim 1.

9. A propylene resin composition, comprising a polypropylene component and a copolymer component of propylene and ethylene, wherein (I) an amount of medium- to low-temperature ethylene/propylene copolymer component that elutes out at temperatures of up to 90° C. by the temperature rising elution fractionation method using an o-dichlorobenzene solvent is from 70 to 97% by weight of the whole eluted amount, an amount of high-temperature polypropylene component that elutes out at temperatures of not lower than 90° C. is from 30 to 3% by weight of the whole eluted amount, and an amount of a low-temperature eluting component that elutes out up to a temperature of 0° C. is not larger than 8% by weight of the whole eluted amount, and (II) the content of the ethylene units in the eluted medium- to low-temperature ethylene/propylene copolymer component is 5 to 17% by weight of said medium- to low-temperature eluted component and the content of the propylene units in the eluted high-temperature polypropylene component is from 97 to 100% by weight of said high-temperature eluted component.

10. A propylene resin composition according to claim 9, wherein the high-temperature eluting component has a melting point of from 130 to 155° C. as measured by differential thermal scanning calorimeter.

11. A propylene resin composition according to claim 10, comprising a propylene/propylene-ethylene block copolymer.

12. A process for the preparation of a block copolymer according to claim 3, wherein the polypropylene component and the propylene/ethylene copolymer component are stepwisely prepared in the presence of a catalyst of a metallocene compound and an aluminoxane compound and/or a non-coordinating ionized compound.

13. A film comprising the propylene resin composition of claim 9.

14. A film obtained by laminating a layer of the propylene resin composition of claim 9 and a layer of a thermoplastic resin other than the composition of claim 9.

15. A heat-sealing property-improving agent for a polypropylene film comprising a propylene resin composition of claim 9, wherein said polypropylene film is a film made from a resin other than the composition of claim 9.

16. A film comprising a mixture of 1 to 100 parts by weight of the polypropylene resin composition of claim 9 and 100 parts by weight of a propylene resin other than the resin of the composition of claim 9.

17. The polypropylene resin composition of claim 9 wherein the amount of the medium- to low-temperature ethylene/propylene copolymer component is 80 to 95% by weight, the amount of the high-temperature polypropylene component is 5 to 20% by weight and the amount of the low-temperature component is no larger than 6% by weight.

18. The polypropylene resin composition of claim 17 wherein the content of ethylene units in the ethylene/propylene copolymer component is 6 to 15% by weight and the content of propylene units in the polypropylene component is 97 to 100% by weight.

* * * * *